United States Patent
Le-Ngoc et al.

(10) Patent No.: US 10,230,423 B2
(45) Date of Patent: Mar. 12, 2019

(54) SYSTEM AND METHOD FOR BALANCED PASSIVE CANCELLATION FOR FULL DUPLEX COMMUNICATIONS

(71) Applicant: Huawei Technologies Canada Co., Ltd., Kanata (CA)

(72) Inventors: Tho Le-Ngoc, Montreal (CA); Thanh Ngon Tran, Montreal (CA)

(73) Assignee: Huawei Technologies Canada Co., Ltd., Kanata, Ontario (CA)

( * ) Notice: Subject to any disclaimer, the term of this patent is extended or adjusted under 35 U.S.C. 154(b) by 380 days.

(21) Appl. No.: 14/936,928

(22) Filed: Nov. 10, 2015

(65) Prior Publication Data

US 2017/0134067 A1     May 11, 2017

(51) Int. Cl.
  *H04B 1/56*    (2006.01)
  *H04L 5/14*    (2006.01)

(52) U.S. Cl.
  CPC ............... *H04B 1/56* (2013.01); *H04L 5/14* (2013.01); *H04L 5/1461* (2013.01)

(58) Field of Classification Search
  None
  See application file for complete search history.

(56) References Cited

U.S. PATENT DOCUMENTS

| | | | |
|---|---|---|---|
| 7,834,719 B2 | 11/2010 | Cheung et al. | |
| 7,855,617 B2 | 12/2010 | Cheung et al. | |
| 8,111,640 B2 | 2/2012 | Knox | |
| 2007/0117524 A1* | 5/2007 | Do | H04B 1/44 455/83 |
| 2009/0028074 A1* | 1/2009 | Knox | H01Q 9/0435 370/278 |

(Continued)

FOREIGN PATENT DOCUMENTS

| CN | 103297069 A | 9/2013 |
|---|---|---|
| CN | 103873399 A | 6/2014 |

(Continued)

OTHER PUBLICATIONS

Kim, Jeong-Geun, et al., "Improved Tx-to-Rx Isolation with Balanced Radar Front-end," 34th European Microwave Conference, Amsterdam, Oct. 2004, pp. 1025-1029.

*Primary Examiner* — Gregory B Sefcheck
*Assistant Examiner* — Suk Jin Kang
(74) *Attorney, Agent, or Firm* — Slater Matsil, LLP (57) ABSTRACT

System and method embodiments are provided for implementing balanced passive cancellation of self-interference (SI) for full-duplex (FD) communications. In an embodiment, a transceiver circuit for FD communications comprises an antenna comprising a first port and a second port, a transmitter, and a power divider coupled to the transmitter and comprising a first output and a second output. The transceiver circuit further comprises a receiver, a power combiner coupled to the receiver and comprising a first input and a second input, and a first circulator coupled to the first output of the power divider, the first port of the antenna, and the first input of the power combiner. The transceiver circuit also comprises a second circulator coupled to the second output of the power divider, the second port of the antenna, and the second input of the power combiner.

21 Claims, 6 Drawing Sheets

(56) References Cited

U.S. PATENT DOCUMENTS

| | | | |
|---|---|---|---|
| 2009/0274072 A1* | 11/2009 | Knox | H01Q 1/2225 370/278 |
| 2011/0143691 A1* | 6/2011 | Van Aken | H04B 1/525 455/83 |
| 2012/0182906 A1* | 7/2012 | Knox | H04L 12/40013 370/278 |
| 2012/0188917 A1* | 7/2012 | Knox | H01Q 1/2225 370/277 |
| 2014/0016515 A1 | 1/2014 | Jana et al. | |
| 2014/0204808 A1* | 7/2014 | Choi | H04L 5/143 370/278 |
| 2014/0219139 A1* | 8/2014 | Choi | H04L 5/1461 370/278 |
| 2014/0376419 A1* | 12/2014 | Goel | H04B 1/525 370/278 |
| 2015/0043685 A1* | 2/2015 | Choi | H04L 5/143 375/346 |
| 2015/0078217 A1* | 3/2015 | Choi | H04B 1/525 370/278 |
| 2015/0171903 A1* | 6/2015 | Mehlman | H04B 1/10 375/346 |
| 2015/0188646 A1* | 7/2015 | Bharadia | H04B 1/525 370/278 |
| 2015/0263780 A1* | 9/2015 | Mehlman | H04B 1/10 375/219 |
| 2015/0280893 A1* | 10/2015 | Choi | H04B 1/525 370/281 |
| 2015/0333847 A1* | 11/2015 | Bharadia | H04B 15/00 455/63.1 |
| 2016/0043759 A1* | 2/2016 | Choi | H04L 5/143 375/346 |
| 2016/0056846 A1* | 2/2016 | Moher | H04B 1/0042 375/297 |
| 2016/0127112 A1* | 5/2016 | Shalizi | H04B 1/525 370/278 |
| 2016/0380670 A1* | 12/2016 | Liu | H01P 1/213 455/73 |
| 2017/0104506 A1* | 4/2017 | Liu | H04B 1/1027 |
| 2017/0104574 A1* | 4/2017 | Hahn | H04L 5/14 |
| 2017/0111155 A1* | 4/2017 | Liu | H04L 5/0055 |
| 2017/0187404 A1* | 6/2017 | Hahn | H04L 5/14 |
| 2017/0187513 A9* | 6/2017 | Bharadia | H04L 5/1461 |
| 2017/0195108 A1* | 7/2017 | Liu | H04L 5/1461 |
| 2017/0222687 A1* | 8/2017 | Wyville | H04B 1/40 |
| 2017/0257152 A1* | 9/2017 | Le-Ngoc | H04B 1/0475 |
| 2017/0264420 A1* | 9/2017 | Bharadia | H04L 5/1438 |
| 2018/0026776 A1* | 1/2018 | Lee | H04L 5/1461 |

FOREIGN PATENT DOCUMENTS

| | | |
|---|---|---|
| CN | 104052531 A | 9/2014 |
| CN | 104168052 A | 11/2014 |

* cited by examiner

SYSTEM AND METHOD FOR BALANCED PASSIVE CANCELLATION FOR FULL DUPLEX COMMUNICATIONS

TECHNICAL FIELD

The present invention relates to wireless communications and networking, and, in particular embodiments, to a system and method for balanced passive cancellation for full duplex communications.

BACKGROUND

Transmission systems where signals are either transmitted or received at a time over the same frequency resource are referred to as Half-Duplex (HD) transmission systems. In contrast, with Full-Duplex (FD) systems, the signals are transmitted and received simultaneously over the same frequency resource at the same time. A FD transmitter/receiver (transceiver) allows signals to be transmitted and received simultaneously on the same frequency resource. FD techniques have been used in wired or wireless systems such as telephony or radar systems. FD in wireless communications requires high isolation between the transmitter and receiver components to prevent the relatively high power transmitter signal from interfering with the low power receiver signal. The higher the transmitter power level and receiver sensitivity are, the higher transmitter-receiver isolation is needed.

SUMMARY OF THE INVENTION

In accordance with an embodiment, a transceiver circuit for full-duplex communications comprises an antenna comprising a first port and a second port, a transmitter, and a power divider coupled to the transmitter and comprising a first output and a second output. The transceiver circuit further comprises a receiver, a power combiner coupled to the receiver and comprising a first input and a second input, and a first circulator coupled to the first output of the power divider, the first port of the antenna, and the first input of the power combiner. The transceiver circuit also comprises a second circulator coupled to the second output of the power divider, the second port of the antenna, and the second input of the power combiner.

In accordance with another embodiment, a transceiver circuit for full-duplex communications comprises an antenna comprising a plurality of ports which are grouped in pairs, a corresponding transmitter for each pair of ports of the antenna, and for each pair of ports and the corresponding transmitter, a power divider coupled to the transmitter and comprising a pair of outputs. The transceiver circuit further comprises a corresponding receiver for each pair of ports of the antenna and the corresponding transmitter, and for each pair of ports and the corresponding receiver, a power combiner coupled to the receiver and comprising a pair of inputs. The transceiver circuit also comprises for each port of the antenna, a circulator coupled to the port, to an output of the power divider corresponding to the pair of ports including that port, and to an input of the power combiner corresponding to the pair of ports including that port.

In accordance with yet another embodiment, a method of passive cancellation for full-duplex communications includes receiving, at a transmitter, a transmitter signal, splitting, by a power divider, the transmitter signal into a first output signal and a second output signal, directing, by a first circulator, the first output signal to a first port of an antenna, and directing, by a second circulator, the second output signal to a second port of an antenna. The method further includes receiving a first input signal at the first port, receiving a second input signal at the second port, directing, by the first circulator, the first input signal from the first port to a first input of a power combiner, and directing, by the second circulator, the second input signal from the second port to a second input of the power combiner. The first input signal and the second input signal are combined at the power combiner into a receiver signal, which is forwarded to a receiver.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FD systems have the potential to provide approximately double sum-rate improvements over HD systems. However, FD systems suffer from high self-interference. Self-interference (SI) refers to the noise added to the detected received signal due to reflection of some of the transmitted signal back into the receiver path of the system. FD in wireless communications requires sufficiently high isolation between a transmitter and a receiver in a network component (e.g., a transceiver) to prevent a relatively high power transmitter signal from interfering with a relatively low power receiver signal.

System and method embodiments are provided herein for implementing balanced passive cancellation of SI for FD communications. The embodiments include transceiver structure designs to achieve passive SI cancellation without additional signal processing functions or components such as filters. The structures use a differential-common mode of transmission paths to cancel the transmitter (TX) signal at the receiver (RX) side while allowing the RX signal in the detector. In the embodiment structures, there are two signal connections: a TX port to antenna path and an antenna to RX port path. The TX signal is propagated in a differential mode on the TX port to antenna path and then to a corresponding receiver port, and is canceled at the RX port. The RX signal is propagated in a common mode on the antenna to RX port paths and is allowed at the RX port into a detector. The isolation level between the RX and TX signals depends on the symmetry or balance of the TX port to antenna to corresponding receiver port paths, e.g., including symmetry/balance characteristics of the antenna sub-system. The symmetry/balance is achieved by having similar components on each path and establishing paths with equal effective propagation length. The isolation level does not depend on the frequency response of the components on the paths, and therefore wider signal bandwidth can be achieved. The balanced passive cancellation structures can be integrated with the antenna sub-system to achieve a low-cost, modular, compact FD antenna subsystem providing high isolation between transmitter and receiver, and applicable to any wireless terminal/device. For instance, the transmitter-receiver isolation can be sufficient for FD operation without further SI cancellation in small cells.

Figure 1A:
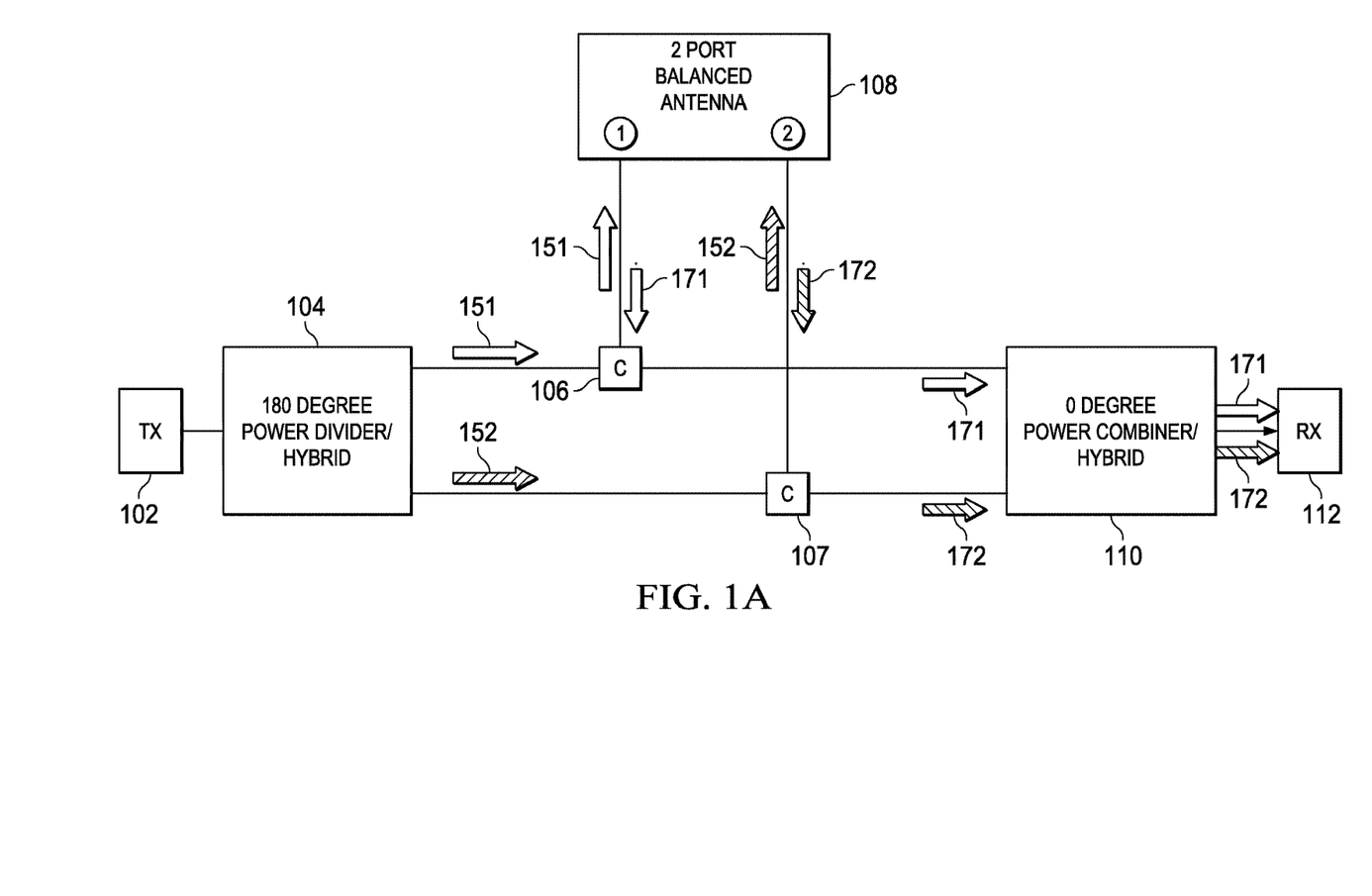
FIGS. 1A and 1B illustrate an embodiment single-input single-output (SISO) full-duplex design.
Figure 1B:
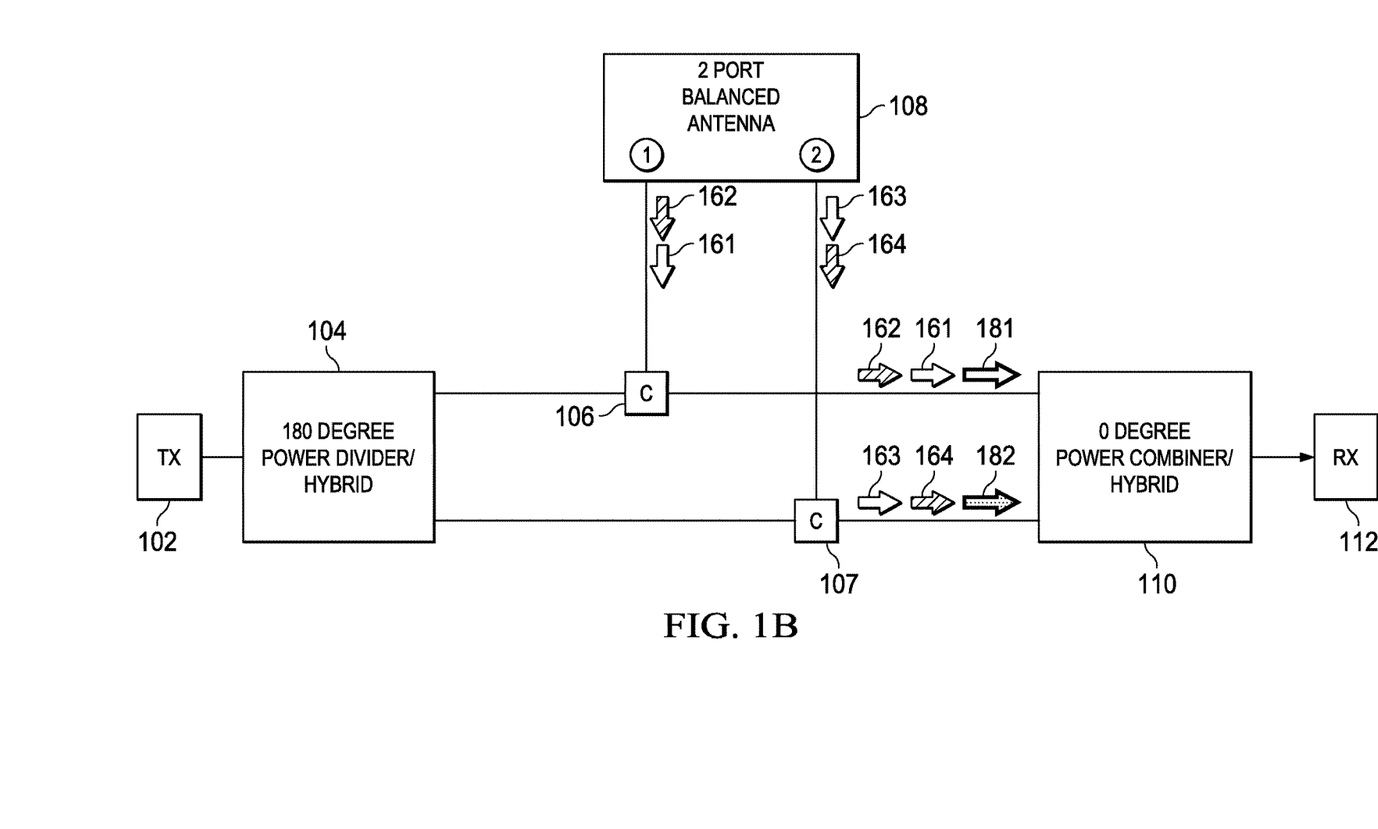

FIGS. 1A and 1B show an embodiment of a single-input single-output (SISO) full-duplex structure design for a FD transceiver. The structure can achieve balanced passive cancellation of SI at the receiver. In this structure, the antenna 108 is a two-port balanced antenna that provides equal propagation distance for corresponding signals or noise components. The paths of the structure are also symmetric in that they have similar components. The structure includes a TX 102, a power divider/hybrid 104 connected to the TX 102, and an upper circulator (C) 106 that connects a first output of the power divider/hybrid 104 to port 1 of the antenna 108. The circulator 106 also connects port 1 of the antenna to a first input of the power combiner/hybrid 110. The power combiner/hybrid 110 is also connected to a RX 112. A lower circulator (C) 107 further connects a second output of the power divider/hybrid 104 to port 2 of the antenna 108. The circulator 107 also connects port 2 of the antenna 108 to a second input of the power combiner/hybrid 110. The divider and combiner hybrids are splitter and combiner devices configured to split and combine signals, respectively, and introduce a predetermined phase difference (e.g., 180-degree or 0-degree phase difference) between the signals.

The connections above with circulators 106 and 107 provide two paths from the two outputs of the power divider/hybrid 104 to the two inputs of the power combiner/hybrid 110, reflecting respectively off the two ports of the antenna 108. In each path, corresponding path segments have equal propagation lengths. In particular, the paths from the power divider/hybrid 104 to each of the circulators 106, 107 have equal propagation lengths, the paths between each of the circulators 106, 107 and the antenna 108 have equal propagation lengths, and the paths from each of the circulators 106, 107 to the power combiner/hybrid 110 have equal propagation lengths. As a result, a noise component due to a signal propagating from the power divider/hybrid 104 to the power combiner/hybrid 110, either by reflecting off the antenna 108 or leaking through the circulator 106 or 107, will have equal propagation lengths regardless of whether it follows the upper path or the lower path. Similarly, a received signal propagating from the antenna 108 to the power combiner/hybrid 110 will have an equal propagation length regardless of whether it follows the upper path or the lower path. The paths with corresponding segments of equal length are referred to herein as balanced paths. It should be understood that two paths described as having "equal length" may have a difference in length that is sufficiently small to maintain the relative phase between signals carried by the two paths.

The TX 102 provides a transmit signal that is divided, by the power divider/hybrid 104, into two equal-amplitude component signals: a first transmit component signal 151 and a second transmit component signal 152. The two transmit component signals 151 and 152 are fed into the two balanced paths. The first transmit component signal 151 is forwarded by the upper circulator 106 to port 1 of the antenna 108. The lower circulator 107 directs the second transmit component signal 152 from the power divider/hybrid 104 to port 2 of the antenna 108. The propagation length of the first and second transmit component signals from the power divider/hybrid 104 to their respective ports of the antenna 108 are equal. A first receive signal 171 is also forwarded by the upper circulator 106 from port 1 of the antenna 108 to the power combiner/hybrid 110. The lower circulator 107 further directs a second receive signal 172 from port 2 of the antenna 108 to the power combiner/hybrid 110. The propagation length of the first and second receive signals from their respective ports of the antenna 108 to the power combiner/hybrid 110 are equal. The propagation of the first transmit component signal 151, the second transmit component signal 152, the first receive signal 171, and the second receive signal 172 is shown in FIG. 1A.

In addition to the first receive signal 171, the upper port of the power combiner/hybrid 110 receives from port 1 of the antenna 108 a noise component 161 as a result of reflection of some of the first transmit component signal 151. The noise component 161 is received at the upper port of the power combiner/hybrid 110 through the upper circulator 106. The upper port of the power combiner/hybrid 110 also receives on the same path from port 1, through the upper circulator 106, a noise component 162 resulting from reflection of some of the second transmit component signal 152. Additionally, some of the first transmit component signal 152 is coupled to the upper circulator 106 and propagated to the upper port of the power combiner/hybrid 110 as a noise component 181. The propagation of the noise components 161, 162 and 181 is shown in FIG. 1B.

A noise component 163 from the first transmit component signal 152 is also reflected back from port 2 to the lower circulator 107, and then directed to a lower port of the combiner/hybrid 110. The lower port of the power combiner/hybrid 110 also receives from port 2, through the upper circulator 106, a noise component 164 resulting from reflection of some of the second transmit component signal 152. Additionally, some of the second transmit component signal 152 is coupled to the lower circulator 107 and propagated on the third path from the power divider/hybrid 104 to the lower port of the power combiner/hybrid 110 as a noise component 182. The propagation of the noise components 163, 164 and 182 is shown in FIG. 1B.

As a result of the balanced paths or propagation lengths of the structure, as described above, the respective signals and noise components that propagate between the various components of the structure with equal effective length maintain their initial phase relation or phase difference. In an embodiment, the power divider/hybrid 104 is a 180-degree power divider/hybrid, and the power combiner/hybrid 110 is a 0-degree power combiner/hybrid. As such, the noise components 161, 162 and 181 originating from the transmit component signals 151 and 152 and arriving at the upper input port of the power combiner/hybrid 110 are out of phase by 180 degrees, due to the 180-degree power divider/hybrid 104, with the corresponding noise components 163, 164 and 182 arriving at lower input port of the power combiner/hybrid 110. The out of phase noise components are also equal in magnitude due to the symmetry/balance of their respective propagation paths. This achieves balanced passive cancellation of SI at RX 112, where the corresponding out of phase noise components having equal magnitude cancel each other when combined at the power combiner/hybrid 110. However, the receive signals 171 and 172 arrive in phase at the power combiner/hybrid 110 and are combined together and sent to the RX 112. Consequently, the RX 112 is able to detect the receive signals 171 and 172 with significantly reduced noise components from the transmit signals. In another embodiment, the power divider/hybrid 104 is a 0-degree power divider/hybrid, and the power combiner/hybrid 110 is a 180-degree power combiner/hybrid, and the receive signals at port 1 and port 2 are 180 degrees out of phase. This arrangement also achieves similar balanced passive cancellation of SI at the RX 112.

Figure 2A:
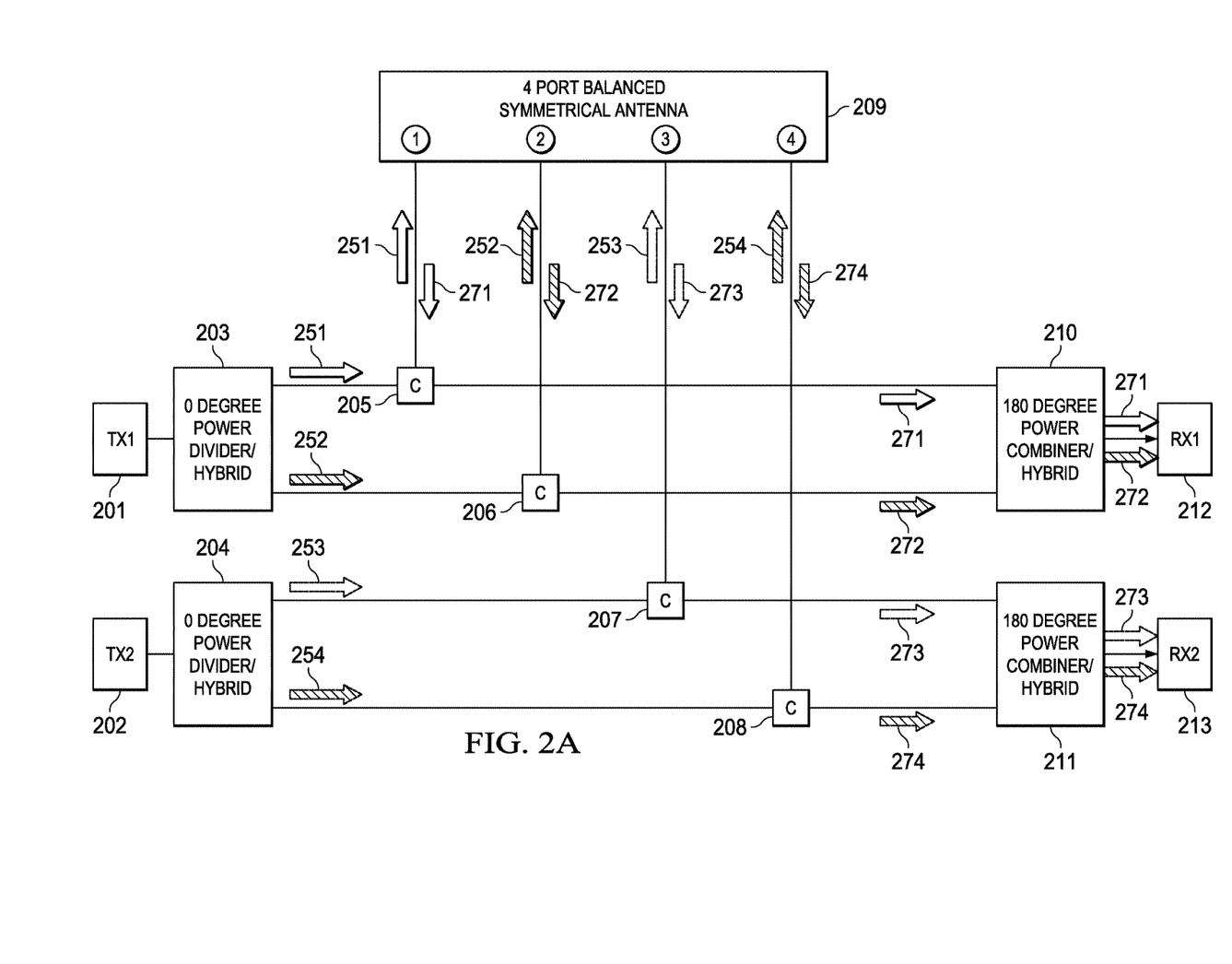
FIGS. 2A and 2B illustrate an embodiment multiple-input multiple-output (MIMO) full-duplex design.
Figure 2B:
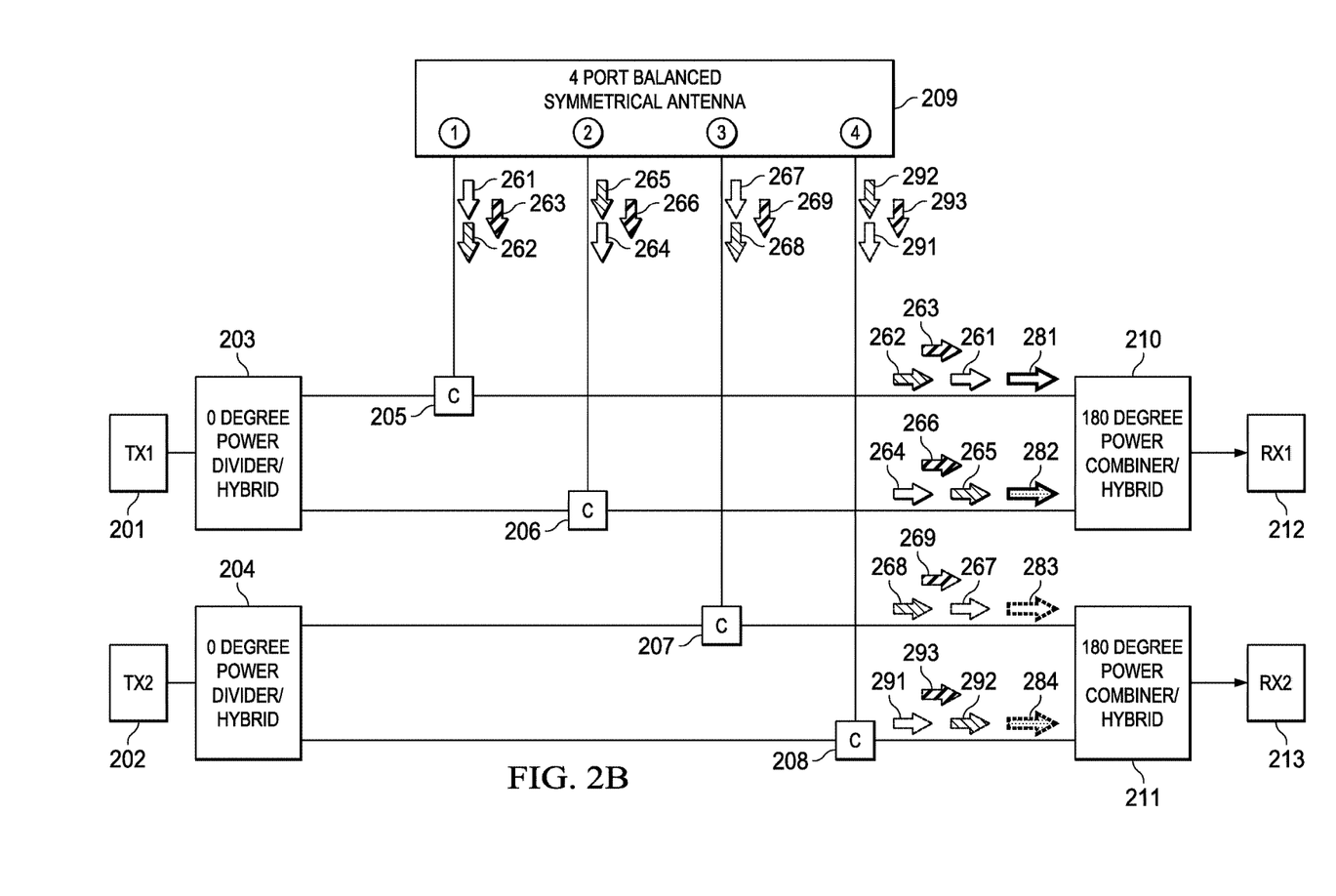

FIGS. 2A and 2B show an embodiment of a 2×2 multiple-input multiple-output (MIMO) full-duplex structure design for a FD transceiver. In this structure, the antenna 209 is a four-port balanced symmetrical antenna with equal propagation distance for corresponding signals or noise components. The structure includes a first TX (TX1) 201, a first power divider/hybrid 203 connected to the first TX 201, and a first circulator (C) 205 that connects a first output of the first power divider/hybrid 203 to port 1 of the antenna 209. The first circulator 205 also connects port 1 of the antenna 209 to a first power combiner/hybrid 210. The first power combiner/hybrid 210 is connected to a first RX (RX1) 210. A second circulator (C) 206 connects a second output of the first power divider/hybrid 203 to port 2 of the antenna 209. The second circulator 206 also connects port 2 of the antenna 209 to a second input of the first power combiner/hybrid 210.

A second power divider/hybrid 204 is connected to the second TX (TX2) 202. A third circulator 207 connects a first output of the second power divider/hybrid 204 to port 3 of the antenna 209. The third circulator 207 also connects port 3 to a first input of a second power combiner/hybrid 211. The third circulator 207 is connected to a second RX (RX2) 213. A fourth circulator (C) 208 connects a second output of the second power divider/hybrid 204 to port 4 of the antenna 209. The fourth circulator 208 also connects port 4 to a second input of the second power combiner/hybrid 211.

The connections above with circulators 205 to 208 provide four paths from the outputs of the two power dividers/hybrids 203 and 204 to the inputs of the two power combiners/hybrids 210 and 211, reflecting respectively off the four ports of the antenna 209. In each path, corresponding path segments have equal propagation lengths. In particular, the paths from the power divider/hybrid 203 to each of the circulators 205, 206 have equal propagation lengths, the paths between each of the circulators 205, 206 and the antenna 209 have equal propagation lengths, and the paths from each of the circulators 205, 206 to the power combiner/hybrid 210 have equal propagation lengths. Similarly, the paths from the power divider/hybrid 204 to each of the circulators 207, 208 have equal propagation lengths, the paths between each of the circulators 207, 208 and the antenna 209 have equal propagation lengths, and the paths from each of the circulators 207, 208 to the power combiner/hybrid 211 have equal propagation lengths. As a result, a noise component due to a signal propagating from either of the power divider/hybrids 203, 204 to the respective power combiner/hybrids 210, 211, either by reflecting off the antenna 209 or leaking through the circulator 205 to 208, will follow a pair of paths having equal propagation lengths. Similarly, a received signal propagating from the antenna 209 to the power combiners/hybrids 210, 211 will follow a pair of paths having equal propagation lengths.

The TX 201 provides a first transmit signal that is divided, by the first power divider/hybrid 203, into two equal-amplitude component signals: a first transmit component signal 251 and a second transmit component signal 252. The two transmit component signals 251 and 252 are fed into two of the balanced paths of the structure. The first transmit component signal 251 is forwarded by the first circulator 205 to port 1 of the antenna 209. The second circulator 206 directs the second transmit component signal 252 from the power divider/hybrid 203 to port 2 of the antenna 209. The propagation length of the first and second transmit component signals from the power divider/hybrid 203 to their respective ports of the antenna 209 are equal. A first receive signal 271 is also forwarded by the first circulator 205 from port 1 to an upper port of the first power combiner/hybrid 210. The second circulator 206 also directs a second receive signal 272 from port 2 to a lower port of the power combiner/hybrid 210. The propagation length of the first and second receive signals from their respective ports of the antenna 209 to the power combiner/hybrid 210 are equal. The propagation of the first transmit component signal 251, the second transmit component signal 252, the first receive signal 271, and the second receive signal 172 is shown in FIG. 2A.

The TX 202 provides a second transmit signal that is divided, by the second power divider/hybrid 204, into two equal-amplitude component signals: a third transmit component signal 253 and a fourth transmit component signal 254. The two transmit component signals 253 and 254 are fed into two corresponding balanced paths of the structure. The third transmit component signal 253 is forwarded by the third circulator 207 to port 3 of the antenna 209. The fourth circulator 208 directs the fourth transmit component signal 254 from the second power divider/hybrid 204 to port 4 of the antenna 209. The propagation length of the third and fourth transmit component signals from the power divider/hybrid 204 to their respective ports of the antenna 209 are equal. A third receive signal 273 is also forwarded by the third circulator 207 from port 3 to an upper port of the second power combiner/hybrid 211. The fourth circulator 208 also directs a fourth receive signal 274 from port 4 to a lower port of the second power combiner/hybrid 211. The propagation length of the third and fourth receive signals from their respective ports of the antenna 209 to the power combiner/hybrid 211 are equal. The propagation of the third transmit component signal 253, the fourth transmit component signal 254, the third receive signal 273, and the fourth receive signal 274 is shown in FIG. 2A.

The upper port of the first power combiner/hybrid 210 also receives from port 1 a noise component 261 as a result of reflection of some of the first transmit component signal 251. The noise component 261 is received at the upper port of the power combiner/hybrid 210 through the first circulator 205. The upper port of the power combiner/hybrid 210 further receives from port 1, through the first circulator 205, a noise component 262 resulting from reflection of some of the second transmit component signal 252, and a noise component 263 resulting from reflection of some of the third and fourth transmit component signals 253 and 254. Additionally, some of the first transmit component signal 251 is coupled to the first circulator 205 and propagated to the upper port of the power combiner/hybrid 210 as a noise component 281. The propagation of the noise components 261, 262, 263 and 281 is shown in FIG. 2B.

The lower port of the first power combiner/hybrid 210 further receives from port 2, through the second circulator 206, a noise component 264 as a result of reflection of some of the first transmit component signal 251. The lower port of the power combiner/hybrid 210 further receives from port 2, through the second circulator 206, a noise component 265 resulting from reflection of some of the second transmit component signal 252, and a noise component 266 resulting from reflection of some of the third and fourth transmit component signals 253 and 254. Additionally, some of the second transmit component signal 252 is coupled to the second circulator 206 and propagated to the lower port of the power combiner/hybrid 210 as a noise component 282. The propagation of the noise components 264, 265, 266 and 282 is shown in FIG. 2B.

Further, the upper port of the second power combiner/hybrid 211 receives from port 3 of the antenna 209 a noise component 267 as a result of reflection of some of the third transmit component signal 253. The noise component 267 is received at the upper port of the second power combiner/hybrid 211 through the third circulator 207. The upper port of the second power combiner/hybrid 211 further receives from port 3, through the third circulator 207, a noise component 268 resulting from reflection of some of the fourth transmit component signal 254, and a noise component 269 resulting from reflection of some of the first and second transmit component signals 251 and 252. Additionally, some of the third transmit component signal 253 is coupled to the third circulator 207 and propagated to the upper port of the second power combiner/hybrid 211 as a noise component 283. The propagation of the noise components 267, 268, 269 and 283 is shown in FIG. 2B.

The lower port of the second power combiner/hybrid 211 further receives from port 4 of the antenna 209, through the fourth circulator 208, a noise component 291 as a result of reflection of some of the fourth transmit component signal 254. The lower port of the second power combiner/hybrid 211 further receives from port 4, through the fourth circulator 208, a noise component 292 resulting from reflection of some of the third transmit component signal 253, and a noise component 293 resulting from reflection of some of the first and second transmit component signals 251 and 252. Additionally, some of the fourth transmit component signal 254 is coupled to the fourth circulator 208 and propagated to the lower port of the power combiner/hybrid 211 as a noise component 284. The propagation of the noise components 291, 292, 293 and 284 is shown in FIG. 2B.

As a result of the balanced paths or propagation lengths of the structure, as described above, the respective signals and noise components that propagate between the various components of the structure with equal effective length maintain their initial phase relation or phase difference. In an embodiment, the power dividers/hybrids 203 and 204 are 0-degree power dividers/hybrids, and the power combiners/hybrids 210 and 211 are 180-degree power combiners/hybrids. As such, the noise components 261-263 and 281 originating from the transmit component signals 251 and 252 at the upper port of the first 180-degree power combiner/hybrid 210 arrive in phase with the corresponding noise components 264-266 and 282 at the lower port of the power combiner/hybrid 210. If the components of the structure are arranged to keep the paths and other propagation lengths balanced, the noise components from port 1 at the upper port of the first power combiner/hybrid 210 are also equal to the corresponding noise components from port 2 at the lower port of the first power combiner/hybrid 210. Thus, noise components due to signals originating at the TX 202 can be canceled at the 180-degree power combiner/hybrid 210. Additionally, given that the receive signals 271 and 272 from the antenna 209 are out of phase, they are combined at the power combiner/hybrid 210 and sent to the RX 212. Similarly, the noise components 267-269 and 283 arrive at the upper port of the second power combiner/hybrid 211 in phase and at equal magnitude with the corresponding noise components 291-293 and 284 at the lower port of the second power combiner/hybrid 211, and are canceled out. The receive signals 273 and 274 are sent out of phase from the antenna 209 and are combined by the 180-degree power combiner/hybrid 211 and then sent to the RX 213. In another embodiment, the power dividers/hybrids 203 and 204 are 180-degree power dividers/hybrids, and the power combiners/hybrids 210 and 211 are 0-degree power combiners/hybrids. In this case, the receive signals at all four ports of the antenna 209 are in phase. This arrangement also achieves similar balanced passive cancellation of SI at the RX 212 and RX 213.

In other embodiments, the balanced passive cancellation structure can have any equal number of transmitters and corresponding receivers, with a respective divider in front of each transmitter and a respective combiner before each receiver. A circulator is placed between each of two outputs of each divider and a corresponding input of the combiner. The circulator is also coupled to a corresponding port of the antenna designated for that transmitter and receiver pair. The paths are further arranged to ensure equal propagation length of the transmit and receive signals and the noise components resulting from the transmit signals. This achieves symmetrical propagation lengths between the transmitter, antenna, and receiver. The path symmetry and balance achieves SI cancellation, as described above in the cases of the SISO and 2×2 MIMO structures.

Figure 3:
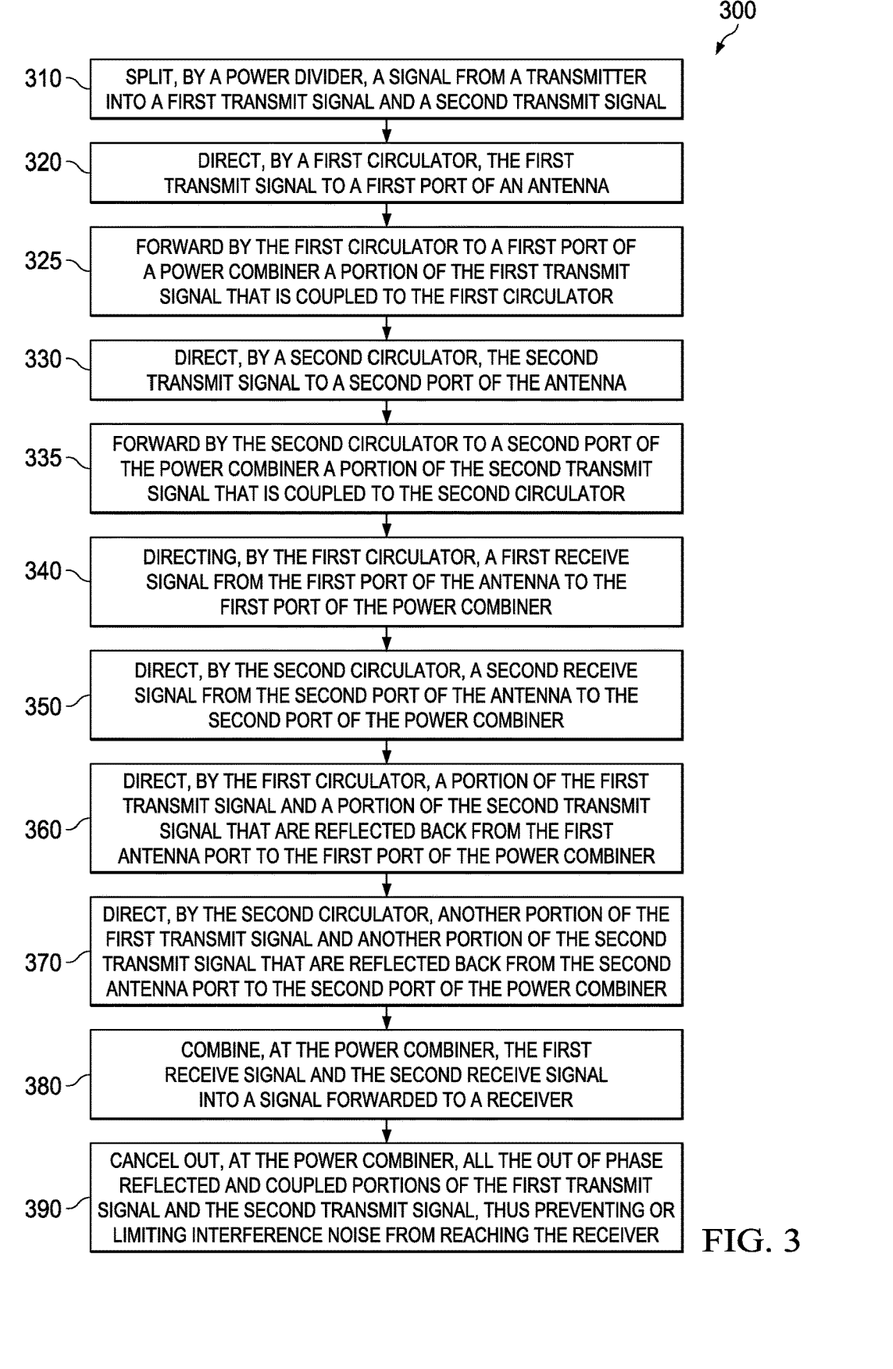
FIG. 3 illustrates an embodiment method for implementing a full-duplex operation.

FIG. 3 shows an embodiment method 300 for implementing a FD operation in a transceiver structure as described above. At step 310, a signal from a transmitter is split, by a 180-degree power divider/hybrid, into a first transmit signal and a second transmit signal that are out of phase (at 180 degree phase difference) and at equal magnitude. At step 320, the first transmit signal is directed, by a first circulator, to a first port of an antenna. At step 325, a portion of the first transmit signal that is coupled to the first circulator is forwarded to a first port of a 0-degree power combiner/hybrid. At step 330, the second transmit signal is directed, by a second circulator, to a second port of an antenna. At step 335, a portion of the second transmit signal that is coupled to the second circulator is forwarded to a second port of the 0-degree power combiner/hybrid. This portion of the second transmit signal is out of phase with the portion of the first transmit signal forwarded to the first port of the 0-degree power combiner/hybrid.

At step 340, a first receive signal at the first port of the antenna is directed, by the first circulator, to the first port the 0-degree power combiner/hybrid. At step 350, a second receive signal is directed, by the second circulator, from the second port of the antenna to the second port of the 0-degree power combiner/hybrid. At step 360, a portion of the first transmit signal that is reflected back from the first antenna port is also directed by the first circulator to the first port of the 0-degree power combiner/hybrid. A portion of the second transmitted signal that is also reflected from the first antenna port is directed by the first circulator to the first port of the 0-degree power combiner/hybrid. At step 370, another portion of the second transmit signal that is reflected back from the second antenna port is further directed by the second circulator to the second port of the 0-degree power combiner/hybrid. Another portion of the first transmit signal that is also reflected from the second antenna port is directed by the second circulator to the second port of the 0-degree power combiner/hybrid. At step 380, the first receive signal and the second receive signal are combined by the 0-degree power combiner/hybrid, into a signal that is forwarded to a receiver. When the two portions arrive at the 0-degree power combiner/hybrid, they are combined with this 180 degree phase difference, and thus are canceled with each other. The cancellation of the two portions removes or reduces any noise that may be sent to the RX 112. At step 390, the 0-degree power combiner/hybrid combines out all the out of phase reflected and coupled portions of the first transmit signal and the second transmit signal, thus reducing the amount of noise detected at the RX 112.

The steps of the method 300 may take place simultaneously because signals may be transmitted and received at the same time. In another embodiment, the same steps are implemented using a 0-degree power divider/hybrid, a 180-degree power combiner/hybrid, and out of phase receive signals at the first and second ports of the antenna. In other embodiments, similar steps can be implemented with structures comprising multiple transmitter and receiver pairs, such as the MIMO full-duplex structure described in FIG. 2.

Figure 4:
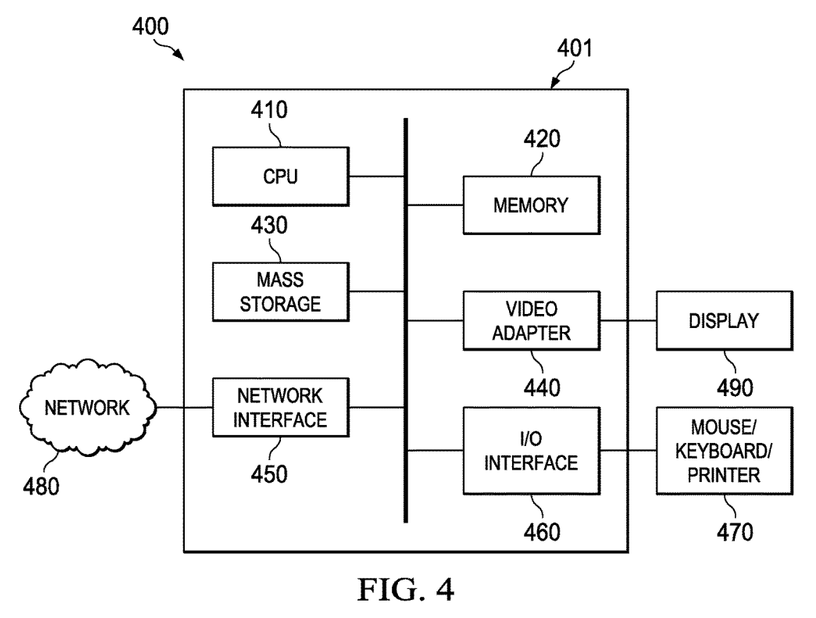
FIG. 4 is a diagram of a processing system that can be used to implement various embodiments.

FIG. 4 is a block diagram of a processing system 400 that can be used to implement various embodiments. The processing system 400 can be part of a wireless communications terminal/device such as a user equipment (UE), e.g., a smart phone, tablet computer, a laptop, or a desktop computer. The system can also be part of a network entity or component that serves the terminal, such as a base station, a small cell (Femto or Pico cell), or a WiFi access point (AP). The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display 490 coupled to the video adapter 440 and any combination of mouse/keyboard/printer 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A transceiver system for full-duplex communications comprising:
   a first power divider-hybrid having an input port, and first and second output ports;
   a first power combiner-hybrid having first and second input ports, and an output port;
   a first signal path having: a first path segment of the first signal path coupling the first output port of the first power divider-hybrid to a first circulator; a second path segment of the first signal path coupling the first circulator to a first port of an antenna; and a third path segment of the first signal path coupling the first circulator to the first input port of the first power combiner-hybrid; and a second signal path having: a first path segment of the second signal path coupling the second output port of the first power divider-hybrid to a second circulator; a second path segment of the second signal path coupling the second circulator to a second port of the antenna; and a third path segment of the second signal path coupling the second circulator to the second input port of the first power combiner-hybrid, the first path segment of the first signal path and the first path segment of the second signal path having a first equal propagation length, the second path segment of the first signal path and the second path segment of the second signal path having a second equal propagation length, and the third path segment of the first signal path and the third path segment of the second signal path having a third equal propagation length, the first power divider-hybrid being either a 180-degree power divider-hybrid or a 0-degree power divider-hybrid;

the first, second, and third path segments of the respective signal paths with corresponding equal propagation length creating balanced signal paths for cancelling out of phase portions of a signal for achieving passive self-interference cancellation.

2. The transceiver system of claim 1 further comprising:
a transmitter coupled to the input port of the first power divider-hybrid; and
a receiver coupled to the output port of the first power combiner-hybrid.

3. The transceiver system of claim 1, wherein the first power divider-hybrid is a 180-degree power divider-hybrid and a phase difference between a first transmit signal and a second transmit signal is 180-degrees, the first transmit signal propagating from the first circulator to the first port of the antenna, the second transmit signal propagating from the second transmit signal propagating from the second circulator to the second port of the antenna.

4. The transceiver system of claim 3, wherein the first power combiner-hybrid is a 0-degree power combiner-hybrid for combining a first receive signal and a second receive signal without adding a phase difference between the first receive signal and the second receive signal.

5. The transceiver system of claim 3, wherein a first receive signal at the first port of the antenna and a second receive signal at the second port of the antenna are in phase.

6. The transceiver system of claim 3, wherein noise at the first port and the second port of the first power combiner-hybrid is out of phase.

7. The transceiver system of claim 1, wherein the first power divider-hybrid is a 0-degree power divider-hybrid and a phase difference between a first transmit signal and a second transmit signal is 0-degrees, the first transmit signal propagating from the first circulator to the first port of the antenna, the second transmit signal propagating from the second transmit signal propagating from the second circulator to the second port of the antenna.

8. The transceiver system of claim 7, wherein the first power combiner-hybrid is a 180-degree power combiner-hybrid for combining a first receive signal and a second receive signal after adding a 180-degree phase difference between the first receive signal and the second receive signal.

9. The transceiver system of claim 7, wherein a first receive signal at the first port of the antenna and a second receive signal at the second port of the antenna are out of phase.

10. The transceiver system of claim 7, wherein noise at the first port and the second port of the first power combiner-hybrid is in phase.

11. The transceiver system of claim 1, wherein the antenna is a balanced symmetrical antenna that has equal propagation distance at the first port and the second port.

12. A transceiver system for full-duplex communications comprising:
a first power divider-hybrid having an input port, and first and second output ports, the first power divider-hybrid being either a 180-degree power divider-hybrid or a 0-degree power divider-hybrid;
a first power combiner-hybrid having first and second input ports, and an output port;
a first signal path having: a first path segment of the first signal path coupling the first output port of the first power divider-hybrid to a first circulator; a second path segment of the first signal path coupling the first circulator to a first port of an antenna; and a third path segment of the first signal path coupling the first circulator to the first input port of the first power combiner-hybrid;
a second signal path having: a first path segment of the second signal path coupling the second output port of the first power divider-hybrid to a second circulator; a second path segment of the second signal path coupling the second circulator to a second port of the antenna; and a third path segment of the second signal path coupling the second circulator to the second input port of the first power combiner-hybrid,
the first path segment of the first signal path and the first path segment of the second signal path having a first equal propagation length, the second path segment of the first signal path and the second path segment of the second signal path having a second equal propagation length, and the third path segment of the first signal path and the third path segment of the second signal path having a third equal propagation length;
a second power divider-hybrid having an input port, and first and second output ports, the second power divider-hybrid being either a 180-degree power divider-hybrid or a 0-degree power divider-hybrid;
a second power combiner-hybrid having first and second input ports, and an output port;
a third signal path having: a first path segment of the third signal path coupling the first output port of the second power divider-hybrid to a third circulator; a second path segment of the third signal path coupling the third circulator to a first port of the antenna; and a third path segment of the third signal path coupling the third circulator to the first input port of the second power combiner-hybrid; and
a fourth signal path having: a first path segment of the fourth signal path coupling the second output port of the second power divider-hybrid to a fourth circulator; a second path segment of the fourth signal path coupling the fourth circulator to a second port of the antenna; and a third path segment of the fourth signal path coupling the fourth circulator to the second input port of the second power combiner-hybrid,
the first path segment of the third signal path and the first path segment of the fourth signal path having a fourth equal propagation length, the second path segment of the third signal path and the second path segment of the fourth signal path having a fifth equal propagation length, and the third path segment of the third signal path and the third path segment of the fourth signal path having a sixth equal propagation length;

the first, second, and third path segments of the respective signal paths with corresponding equal propagation length creating balanced signal paths for cancelling out of phase portions of a signal for achieving passive self-interference cancellation.

13. The transceiver system of claim 12 further comprising:
a second transmitter coupled to the input port of the second power divider-hybrid; and
a second receiver coupled to the output port of the second power combiner-hybrid.

14. A method of passive cancellation for full-duplex communications comprising:
splitting, by a power divider-hybrid, a signal from a transmitter into a first transmit signal on a first signal path and a second transmit signal on a second signal path;
forwarding the first transmit signal from a first output port of the power divider-hybrid to a first circulator on a first path segment of the first signal path;
forwarding the first transmit signal from the first circulator to a first port of an antenna on a second path segment of the first signal path;
forwarding a first receive signal from the first port of an antenna to a first input port of the power combiner-hybrid on a third path segment of the first signal path;
forwarding the second transmit signal from a second output port of the power divider-hybrid to a second circulator on a first path segment of the second signal path;
forwarding the second transmit signal from the second circulator to a second port of the antenna on a second path segment of the second signal path; and
forwarding a second receive signal from the second port of the antenna to a second input port of the power combiner-hybrid on a third path segment of the second signal path,
the first path segment of the first signal path and the first path segment of the second signal path having a first equal propagation length, the second path segment of the first signal path and the second path segment of the second signal path having a second equal propagation length, and the third path segment of the first signal path and the third path segment of the second signal path having a third equal propagation length, a phase difference between the first transmit signal and the second transmit signal being either 0-degrees or 180-degrees;
the first, second, and third path segments of the respective signal paths with corresponding equal propagation length creating balanced signal paths for cancelling out of phase portions of a signal for achieving passive self-interference cancellation.

15. The method of claim 14 further comprising:
combining, at the power combiner-hybrid, the first receive signal and the second receive signal into a total receive signal; and
sending the total receive signal to a receiver.

16. A method of passive cancellation for full-duplex communications comprising:
splitting, by a power divider-hybrid, a signal from a transmitter into a first transmit signal on a first signal path and a second transmit signal on a second signal path;
forwarding the first transmit signal from a first output port of the power divider-hybrid to a first circulator on a first path segment of the first signal path;
forwarding the first transmit signal from the first circulator to a first port of an antenna on a second path segment of the first signal path;
forwarding a first receive signal from the first port of an antenna to a first input port of the power combiner-hybrid on a third path segment of the first signal path;
forwarding the second transmit signal from a second output port of the power divider-hybrid to a second circulator on a first path segment of the second signal path;
forwarding the second transmit signal from the second circulator to a second port of the antenna on a second path segment of the second signal path:
forwarding a second receive signal from the second port of the antenna to a second input port of the power combiner-hybrid on a third path segment of the second signal path,
the first path segment of the first signal path and the first path segment of the second signal path having a first equal propagation length, the second path segment of the first signal path and the second path segment of the second signal path having a second equal propagation length, and the third path segment of the first signal path and the third path segment of the second signal path having a third equal propagation length, a phase difference between the first transmit signal and the second transmit signal being either 0-degrees or 180-degrees;
splitting, by a second power divider-hybrid, a second signal from a second transmitter into a third transmit signal on a third signal path and a fourth transmit signal on a fourth signal path;
forwarding the third transmit signal from a first output port of the second power divider-hybrid to a third circulator on a first path segment of the third signal path;
forwarding the third transmit signal from the third circulator to a third port of the antenna on a second path segment of the third signal path;
forwarding a third receive signal from the third port of the antenna to a first input port of the second power combiner-hybrid on a third path segment of the third signal path;
forwarding the fourth transmit signal from a second output port of the second power divider-hybrid to a fourth circulator on a first path segment of the fourth signal path;
forwarding the fourth transmit signal from the fourth circulator to a fourth port of the antenna on a second path segment of the fourth signal path; and
forwarding a fourth receive signal from the fourth port of the antenna to a second input port of the second power combiner-hybrid on a third path segment of the fourth signal path,
the first path segment of the third signal path and the first path segment of the fourth signal path having a fourth equal propagation length, the second path segment of the third signal path and the second path segment of the fourth signal path having a fifth equal propagation length, and the third path segment of the third signal path and the third path segment of the fourth signal path having a sixth equal propagation length, a phase difference between the third transmit signal and the fourth transmit signal being either 0-degrees or 180-degrees; the first, second, and third path segments of the respective signal paths with corresponding equal propagation length creating balanced signal paths for cancelling out of phase portions of a signal for achieving passive self-interference cancellation.

17. The method of claim 16 further comprising:
combining, at the second power combiner-hybrid, the third receive signal and the fourth receive signal into a second total receive signal; and
sending the second total receive signal to a second receiver.

18. The method of claim 14, wherein the phase difference between the first transmit signal and the second transmit signal is 180-degrees, and the power divider-hybrid is a 180-degree power divider-hybrid, and wherein the power combiner-hybrid is a 0-degree power combiner-hybrid that combines the first receive signal and the second receive signal without adding a phase difference between the first receive signal and the second receive signal.

19. The method of claim 18, wherein the first receive signal at the first port of the antenna and the second receive signal at the second port of the antenna are in phase, and wherein noise at the first port and the second port of the power combiner-hybrid is out of phase.

20. The method of claim 14, wherein the phase difference between the first transmit signal and the second transmit signal is 0-degrees, and the power divider-hybrid is a 0-degree power divider-hybrid, and wherein the power combiner-hybrid is a 180-degree power combiner-hybrid that combines the first receive signal and the second receive signal after adding a 180-degree phase difference between the first receive signal and the second receive signal.

21. The method of claim 20, wherein the first receive signal at the first port of the antenna and the second receive signal at the second port of the antenna are out of phase, and wherein noise at the first port and the second port of the power combiner-hybrid is in phase.

* * * * *